United States Patent Office 3,364,233
Patented Jan. 16, 1968

3,364,233
METHOD OF PREPARING TETRA-
CHLOROTHIOPHENE
Murray Hauptschein, Glenside, Pa., and Victor
Mark, Ransomville, N.Y., assignors to Pennsalt
Chemicals Corporation, Philadelphia, Pa., a corporation of Pennsylvania
No Drawing. Filed Sept. 29, 1965, Ser. No. 491,383
7 Claims. (Cl. 260—332.5)

ABSTRACT OF THE DISCLOSURE

Tetrachlorothiophene is prepared by reacting sulfur with a chlorothiolene or chlorothiolane of the formulae

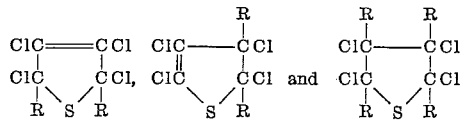

The principal co-product of the reaction is sulfur monochloride.

---

This invention relates to the preparation of tetrachlorothiophene. More particularly, this invention concerns a process for preparing tetrachlorothiophene which comprises reacting sulfur with chlorinated thiolenes or chlorinated thiolanes.

Tetrachlorothiophene,

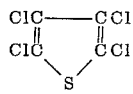

is a well known compound having pesticidal properties which is used as a fungicide, insecticide, nematocide or germicide. Various methods have been disclosed for its preparation. For example, the process disclosed in U.S. Patent No. 2,900,394 involves reacting hexachlorobutadiene with sulfur at elevated temperatures for 7 to 50 hours. In another method, described in U.S. Patent No. 2,851,464, tetrachlorothiophene is made by contacting hexachlorothiolane at elevated temperatures with activated carbon. The major disadvantage of this process is the recognized difficulties associated with handling activated carbon on a commercial scale. In the process of the present invention, wherein sulfur is a reactant, such difficulties are alleviated and other advantages are also realized; for instance, operations are possible at relatively lower temperatures of reaction, the yields of tetrachlorothiophene are high, and sulfur monochloride is obtained as a co-product, which compound is valuable for its many, well known industrial uses. Several prior processes also have been disclosed for producing tetrachlorothiophene by reacting thiophene with chlorine at elevated temperatures and recovering the desired compound by fractional distillation, for example, in U.S. Patent No. 2,492,624. Some of the by-products of these chlorination processes are chlorinated thiolenes. The method of the present invention provides a simple, economical process for further conversion of said chlorinated thiolenes to the desired tetrachlorothiophene.

In accordance with the present invention, tetrachlorothiophene is prepared by reacting sulfur with a chlorothiolene of the general formulae

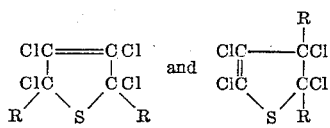

or a chlorothiolane of the general formula

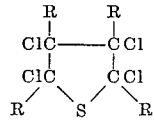

or mixtures of said chlorothiolenes and chlorothiolanes, wherein in all cases R is hydrogen or chlorine. The preferred reactants from the foregoing class of compounds due to their ready availability are 2,2,3,4,5,5-hexachloro-3-thiolene, i.e.,

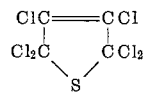

2,2,3,4,5,5-hexachlorothiolane, i.e.,

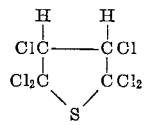

and octachlorothiolane.

The molar ratio of reactants employed in the process is not critical and in general will range from about two moles to about ten moles of sulfur per mole of the chlorothiolene or/and chlorothiolane, however, a molar ratio of sulfur to chlorothiolene(ane) of from about 2:1 to about 5:1 is preferred to obtain highest yields and to achieve a subsequent easier recovery of the tetrachlorothiophene product from unreacted or excess reactants.

The reaction is carried out by contacting the aforesaid reactants at a temperature of at least about 110° C., in a vessel equipped with suitable heating means and agitation. There is little advantage in going to temperatures above about 300° C., since at the higher temperatures there is some tendency to form undesired tarry side-reaction products. The preferred temperature range is from about 120 to 180° C. The reaction is, in general, completed in from about 20 to about 120 minutes, although reaction periods of up to two days may be used.

As stated previously, a co-product of the reaction is sulfur monochloride, $S_2Cl_2$ (B.P. 136° C. at 760 mm. Hg abs. and 54° C. at 0.2 mm. Hg) as well as small amounts of other sulfur chlorides. In addition, when the chlorothiolene or chlorothiolane has hydrogen substituents on the ring carbon atoms, HCl and $H_2S$ are also by-products. Therefore, because of the evolution of these low-boiling by-products, it is desirable to carry out the reaction at atmospheric pressure or sub-atmospheric pressure to facilitate their removal by distillation. Thus, pressures of from about 25 mm. Hg abs. up to atmospheric are preferred, however, super-atmospheric pressures are operable, e.g. up to about 50 p.s.i., although such higher pressures are obviously not advantageous. The reaction normally is conducted in the absence of solvents or other diluents, however, in a less preferred embodiment, an inert liquid diluent can be used, such as mono-, di-, and polychlorobenzenes, polychloronaphthalenes, diphenylether, chlorinated biphenyls and the like.

Following the completion of the reaction herein described, the tetrachlorothiophene product may be recovered from the reaction mixture which contains said product and minor amounts of residual sulfur chlorides, unreacted sulfur, unreacted chlorothiolenes(anes) and other impurities by conventional distillation techniques. The reaction mixture may be treated with water to hydrolyze the residual sulfur chlorides prior to distillation. The hydrolysis may be dispensed with if steam distillation is used. The tetrachlorothiophene is easily separated from any residues by vacuum or steam distillation and crystallization at or below room temperature. It may be further purified by vacuum distillation, steam distillation, sublimation, or crystallization with or without the use of solvents.

In the illustrative examples that follow, "parts" of materials means parts by weight. The determination of the identity of products and their yields were made using infrared or ultraviolet spectral analysis techniques, the principal infrared spectroscopic adsorption bands for the various compounds mentioned below being as follows:

| Compound | Wave length, microns | Intensity of Band |
|---|---|---|
| Hexachloro-3-thiolene (in CCl₄ and CS₂ solution). | 6.16 | Strong. |
| | 8.55 | Very strong. |
| | 8.80 | Medium. |
| | 10.58 | Very strong. |
| | 12.15 | Medium. |
| | 12.90 | Do. |
| | 13.76 | Do. |
| Hexachlorothiolane | 3.37 | Strong. |
| | 7.59 | Do. |
| | 7.93 | Do. |
| | 8.32 | Very strong. |
| | 9.73 | Do. |
| | 11.18 | Do. |
| | 13.06 | Do. |
| | 13.52 | Do. |
| 2,3,5-trichlorothiophene | 3.20 | Medium. |
| | 6.55 | Very strong. |
| | 6.96 | Strong. |
| | 7.58 | Very strong. |
| | 8.73 | Strong. |
| | 9.36 | Medium. |
| | 9.58 | Very strong. |
| | 9.92 | Strong. |
| | 11.59 | Very strong. |
| | 12.29 | Do. |
| | 14.56 | Strong. |
| Tetrachlorothiophene (in CCl₄ and CS₂ solution). | 6.58 | Very strong. |
| | 7.58 | Do. |
| | 7.97 | Strong. |
| | 8.83 | Medium. |
| | 9.13 | Do. |
| | 9.33 | Very strong. |
| | 11.00 | Do. |
| | 12.37 | Do. |
| | 14.96 | Do. |

The ultraviolet maxima are:
Tetrachlorothiophene: $\lambda_{max}$ (isooctane) = 248.5 m$\mu$ (log $\epsilon$ 3.902)
Hexachloro-3-thiolene: $\lambda_{max}$ (isooctane) = 226.8 m$\mu$ (log $\epsilon$ 4.021)

*Example I.—Preparation of hexachlorothiolene and hexachlorothiolane*

In accordance with the procedure of H. L. Coonradt and H. D. Hartough, J. Am. Chem. Soc., 74, 163 (1952), 168.2 parts (2.0 moles) of thiophene is chlorinated, in the presence of 0.4 part of iodine, at 21 to 57° C. for 12.5 hours. The product, 552.3 parts, is fractionated to give a distillate boiling at 72–78° C. and 0.2 mm. Hg absolute pressure, which distillate is cooled to yield 352.3 parts (1.2 moles) of crystalline hexachloro-3-thiolene, M.P. 40–41° C., B.P. 85° C. at 0.7 mm. Hg abs., referred to hereinafter as "Fraction 1" The remainder of the product, boiling predominantly at 90–94° C. and 0.3 mm. Hg abs., referred to as "Fraction 2," consists essentially of about 50% of hexachlorothiolane, 40% of hexachlorothiolene and 10% tetrachlorothiophene.

*Example II*

A mixture of 117.2 parts (0.4 mole) of hexachlorothiolene (Fraction 1 of Example I) and 25.7 parts (0.8 mole) of powdered sulfur is agitated at 170–190° C. for 2.5 hours at atmospheric pressure, during which period the sulfur monochloride co-product boils off and is condensed and collected. Infrared spectral analysis of the residue in the reaction vessel shows that there is about 95% conversion of the hexachlorothiolene to tetrachlorothiophene.

*Example III*

19.4 parts (0.0658 mole) of the "Fraction 2" distillate of Example I, consisting essentially of 50% hexachlorothiolane, 40% hexachlorothiolene and 10% tetrachlorothiophene, is mixed with 4.6 parts (0.144 mole) of sulfur powder. The mixture is heated at 270° C. for about 20 minutes. By-products HCl, H₂S and S₂Cl₂ are distilled off during reaction and recovered. Approximately 80% of the product material in the reaction vessel is identified as tetrachlorothiophene. A product, present in a minor amount, is 2,3,5-trichlorothiophene.

*Example IV*

A mixture of 13.85 parts (0.0381 mole) of octachlorothiolane and 5.0 parts (0.156 mole) of sulfur powder is heated at 120 to 160° C. for 2 hours. Approximately 50% of the octachlorothiolane is converted to a product mixture comprising tetrachlorothiophene in a 75% yield and hexachlorothiolene in 25% yield. The reaction mixture is heated for an additional 2 hours at 180° C. to yield a product consisting essentially of tetrachlorothiophene in about 100% yield.

It is understood that the foregoing specific embodiments are for purposes of illustrating the invention and are not to be considered as limitative of the scope thereof which is defined by the appended claims.

We claim:
1. A method for preparing tetrachlorothiophene which comprises reacting sulfur with an organic compound selected from the group consisting of

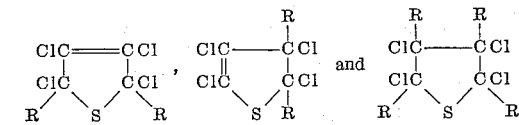

where R is hydrogen or chlorine.

2. The method of claim 1 wherein the reaction is carried out at from about 110° C to about 300° C.

3. The method of claim 2 wherein the mole ratio of the sulfur to the organic compound is within the range of about 2:1 to about 10:1.

4. The method of claim 1 wherein the mole ratio of the sulfur to the organic compound is within the range of about 2:1 to about 5:1 and the reaction is carried out at from about 120° C to about 180° C.

5. A method for preparing tetrachlorothiophene which comprises reacting sulfur with 2,2,3,4,5,5-hexachloro-3-thiolene at a temperature of at least about 110° C.

6. A method for preparing tetrachlorothiophene which comprises reacting sulfur with 2,2,3,4,5,5-hexachlorothiolane at a temperature of at least about 110° C.

7. A method for preparing tetrachlorothiophene which comprises reacting sulfur with octachlorothiolane at a temperature of at least about 110° C.

References Cited

UNITED STATES PATENTS

| 2,504,084 | 4/1950 | Norris, et al. | 260—329 |
| 2,914,573 | 11/1959 | McCoy et al. | 260—650 |
| 3,278,552 | 10/1966 | Geering | 260—330.5 |
| 3,043,887 | 7/1962 | Becke | 260—650 |

OTHER REFERENCES

Friedmann: Chemical Abstracts, 45:7782 (1951).

JOHN D. RANDOLPH, *Primary Examiner.*

WALTER A. MODANCE, *Examiner.*

C. SHURKO, *Assistant Examiner.*